(12) United States Patent
Huang et al.

(10) Patent No.: US 11,489,944 B2
(45) Date of Patent: Nov. 1, 2022

(54) ELECTRONIC APPARATUS AND DATA TRANSMISSION METHOD THEREOF BASED OFF MARQUEES

(71) Applicant: Acer Incorporated, New Taipei (TW)

(72) Inventors: Yu-Chieh Huang, New Taipei (TW); Chih-Wen Huang, New Taipei (TW); Wen-Cheng Hsu, New Taipei (TW); Chao-Kuang Yang, New Taipei (TW); Ling-Fan Tsao, New Taipei (TW); Chueh-Pin Ko, New Taipei (TW); Chih-Chiang Chen, New Taipei (TW); Tai Ju, New Taipei (TW); Yu-Shan Ruan, New Taipei (TW)

(73) Assignee: Acer Incorporated, New Taipei (TW)

( * ) Notice: Subject to any disclaimer, the term of this patent is extended or adjusted under 35 U.S.C. 154(b) by 55 days.

(21) Appl. No.: 17/031,917

(22) Filed: Sep. 25, 2020

(65) Prior Publication Data

US 2021/0329099 A1 Oct. 21, 2021

(30) Foreign Application Priority Data

Apr. 21, 2020 (TW) .................................. 109113233

(51) Int. Cl.
*H04L 67/75* (2022.01)
*G06F 3/04842* (2022.01)
(Continued)

(52) U.S. Cl.
CPC .......... *H04L 67/75* (2022.05); *G06F 3/04842* (2013.01); *G06F 3/04845* (2013.01);
(Continued)

(58) Field of Classification Search
CPC .. G06F 9/543; G06F 3/04842; G06F 3/04845; H04L 67/36; H04L 67/06; G06V 20/20; G06V 30/10
See application file for complete search history.

(56) References Cited

U.S. PATENT DOCUMENTS 8,081,197 B1 * 12/2011 Jude ..................... G06F 3/04845
345/628
8,924,858 B2 * 12/2014 Mistry .................. G06F 3/0488
715/748
(Continued)

FOREIGN PATENT DOCUMENTS

TW 201352028 12/2013
TW I664862 7/2019

OTHER PUBLICATIONS

Kevin Arrows—Appuals "Fix_ Cast to Device not working" (Feb. 11, 2020) (Year: 2020).*

*Primary Examiner* — Beau D Spratt
(74) *Attorney, Agent, or Firm* — JCIPRNET

(57) ABSTRACT

An electronic apparatus and a data transmission method thereof are provided. The data transmission method is adapted to an electronic apparatus including a screen, and the data transmission method includes the following steps. An image frame is displayed through the screen. A selection marquee is displayed on the image frame through the screen, and the selection marquee is configured for selecting a partial image frame from the image frame. Connection information is displayed within the selection marquee through the screen, and feature information of data to be transmitted is recognized from the partial image frame selected by the selection marquee. A connection with another electronic apparatus is established according to the connection information. The data to be transmitted is sent to (Continued)

the another electronic apparatus via the connection according to the feature information.

12 Claims, 8 Drawing Sheets

(51) Int. Cl.
    *H04L 67/06*           (2022.01)
    *G06F 3/04845*       (2022.01)
    *G06V 20/20*          (2022.01)
    *G06V 30/10*          (2022.01)

(52) U.S. Cl.
    CPC .............. *G06V 20/20* (2022.01); *H04L 67/06* (2013.01); *G06V 30/10* (2022.01)

(56) References Cited

U.S. PATENT DOCUMENTS

| | | | | |
|---|---|---|---|---|
| 10,168,978 | B2* | 1/2019 | Ro | G06F 3/0486 |
| 10,602,559 | B2* | 3/2020 | Huh | H04W 76/14 |
| 10,691,327 | B2* | 6/2020 | Park | H04L 67/02 |
| 10,852,915 | B1* | 12/2020 | Behzadi | G06F 3/0482 |
| 10,942,631 | B2* | 3/2021 | Sakamoto | G06F 3/04817 |
| 11,159,932 | B1* | 10/2021 | Meyer | G06F 3/0346 |
| 2010/0276489 | A1 | 11/2010 | Suomela et al. | |
| 2011/0083111 | A1* | 4/2011 | Forutanpour | G06F 3/017 715/863 |
| 2013/0290562 | A1 | 10/2013 | Bells et al. | |
| 2015/0026580 | A1* | 1/2015 | Kang | H04W 12/04 715/728 |
| 2015/0026642 | A1* | 1/2015 | Wilson | G06F 3/0482 715/825 |
| 2015/0317053 | A1* | 11/2015 | Baek | G06F 3/04817 715/765 |
| 2016/0054821 | A1* | 2/2016 | Kim | G06F 3/03545 345/179 |
| 2016/0062557 | A1* | 3/2016 | Kim | G06F 3/0482 715/748 |
| 2016/0117141 | A1* | 4/2016 | Ro | G06F 3/04817 715/748 |
| 2017/0285758 | A1* | 10/2017 | Hastings | G06F 3/04842 |
| 2017/0286419 | A1* | 10/2017 | Tang | G06F 8/38 |
| 2017/0289737 | A1* | 10/2017 | Bataller | H04L 67/06 |
| 2019/0020806 | A1 | 1/2019 | Okazaki et al. | |
| 2019/0020853 | A1* | 1/2019 | Segal | G11B 27/031 |
| 2019/0228220 | A1* | 7/2019 | Matsumoto | G06K 9/00449 |
| 2020/0126239 | A1* | 4/2020 | Qian | G06T 7/20 |
| 2020/0359217 | A1* | 11/2020 | Hwang | H04N 21/25816 |
| 2021/0097125 | A1* | 4/2021 | Khanna | G06F 16/9558 |
| 2021/0375794 | A1* | 12/2021 | Teyssedre | H01L 21/76816 |
| 2021/0392223 | A1* | 12/2021 | Coffman | G06F 3/165 |

\* cited by examiner

ELECTRONIC APPARATUS AND DATA TRANSMISSION METHOD THEREOF BASED OFF MARQUEES

CROSS-REFERENCE TO RELATED APPLICATION

This application claims the priority benefit of Taiwan application serial no. 109113233, filed on Apr. 21, 2020. The entirety of the above-mentioned patent application is hereby incorporated by reference herein and made a part of this specification.

BACKGROUND

Technical Field

The disclosure relates to an electronic apparatus, and more particularly, relates to an electronic apparatus and a data transmission method thereof.

Description of Related Art

With the rapid development of the information and communication technology, development of various electronic apparatuses, and advancement of various functions provided by the electronic apparatuses, people's lives are increasingly inseparable from electronic apparatuses. In modern society, almost everyone owns a variety of different types of electronic apparatuses such as notebook computers, smartphones, mobile Internet devices, tablet computers and so on. Moreover, it is common that a single user may carry plural electronic apparatuses at the same time. It thus can be seen that when a user intends to send data stored in an electronic apparatus to another electronic apparatus, the user may further perform an operation, and such application scenario quite common. Moreover, data sharing land transmission between electronic apparatuses may further create many practical and convenient uses.

Generally, a plurality of operational steps are required when a user intends to transmit data stored in one electronic apparatus to another electronic apparatus. These operational steps include establishing a connection between apparatuses, marking the characters to be transmitted, or selecting the file to be transmitted and the like. However, the user may experience a troublesome and inconvenient using experience when performing these laborious operational steps. Therefore, how data transmission between apparatuses may be completed through an intuitive and convenient operation is an important issue.

SUMMARY

Accordingly, the disclosure provides an electronic apparatus and a data transmission method thereof through which convenience and practicability of data transmission between apparatuses is enhanced, so that a favorable user experience is provided.

A data transmission method provided by an embodiment of the disclosure is adapted to an electronic apparatus including a screen. The method includes the following steps. An image frame is displayed through the screen. A selection marquee is displayed on the image frame through the screen, and the selection marquee is configured for selecting a partial image frame from the image frame. Connection information is displayed within the selection marquee through the screen, and feature information of data to be transmitted is recognized from the partial image frame selected by the selection marquee. A connection with another electronic apparatus is established according to the connection information. The data to be transmitted is sent to the another electronic apparatus via the connection according to the feature information.

An embodiment of the disclosure provides an electronic apparatus including a screen, a connection device, a storage device, and a processor. The screen is configured to display an image frame, and the storage device stores a plurality of modules. The processor is coupled to the screen, the connection device, and the storage device and is configured for executing the modules to perform the following steps. An image frame is displayed through the screen. A selection marquee is displayed on the image frame through the screen, and the selection marquee is configured for selecting a partial image frame from the image frame. Connection information is displayed within the selection marquee through the screen, and feature information of data to be transmitted is recognized from the partial image frame selected by the selection marquee. A connection with another electronic apparatus is established according to the connection information. The data to be transmitted is sent to the another electronic apparatus via the connection according to the feature information.

To sum up, in the embodiments of the disclosure, the screen of the electronic apparatus displays the image frame and the selection marquee on the image frame. The selection marquee may be moved or rotated above the image frame in response to an operation performed by the user. The electronic apparatus displays the connection information within the selection marquee through the screen and recognizes the feature information of the data to be transmitted from the partial image frame selected by the selection marquee. Therefore, the electronic apparatus may establish the connection with the another electronic apparatus in response to the connection information displayed in the selection marquee and sends the data to be transmitted to the another electronic apparatus according to the feature information presented in the partial image frame. Accordingly, the selection marquee may be configured to determine displaying the display location of the connection information and marking the data to be transmitted at the same time, so that operational steps of data transmission between apparatuses are significantly simplified, and convenience of using the electronic apparatuses is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
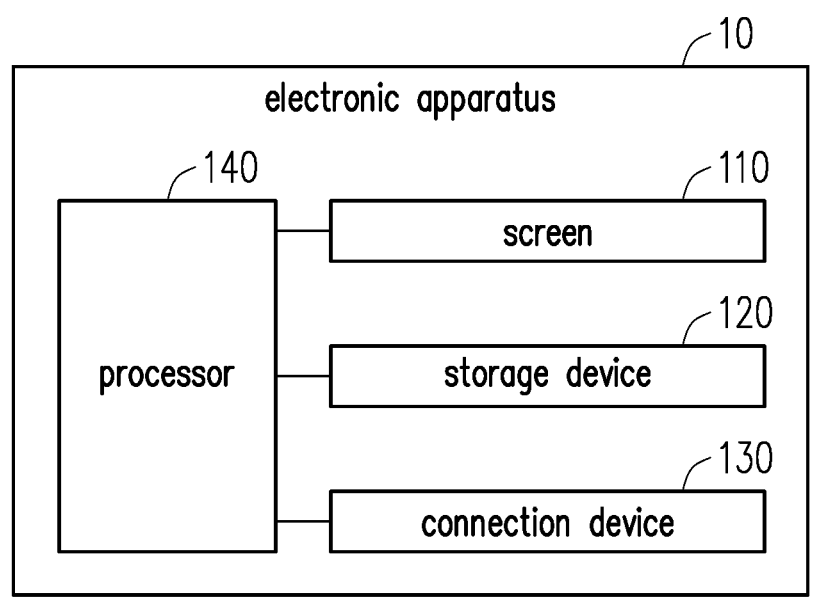
FIG. 1 is a schematic view of an electronic apparatus according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, the embodiments serve as examples of the apparatus and method fall within the scope of the claims of the disclosure.

FIG. 1 is a schematic view of an electronic apparatus according to an embodiment of the disclosure. It should be noted that the illustrations are provided to make the description more comprehensible and are not intended to limit the disclosure. With reference to FIG. 1, an electronic apparatus 10 includes a screen 110, a storage device 120, a connection device 130, and a processor 140. The electronic apparatus 10 may be an electronic apparatus including a screen such as a notebook computer, a smartphone, a personal digital assistant, a tablet computer, a digital camera, an e-book, or a game console, and the disclosure is not limited thereto.

The screen 110 may be a display device providing a display function. Such display device is, for example, a liquid crystal display (LCD), a light-emitting diode (LED) display, a field emission display (FED), an organic light-emitting diode (OLED) display, or a display of other types, and the disclosure is not limited thereto.

The storage device 120 is configured to store data such as a file, an image, a command, program code, a software component, etc. and may be, for example, a fixed or movable random access memory (RAM) in any form, a read-only memory (ROM), a flash memory, a hard disc or other similar devices, an integrated circuit, and a combination thereof.

The connection device 130 is configured to establish a wireless communication connection, so that the electronic apparatus 10 may be connected to other mobile electronic apparatuses through a wireless network. The wireless communication connection is classified according to communication network types and may include a wireless personal area network (WPAN) connection or a wireless local area network (WLAN) connection, which is not limited by the disclosure. Herein, regarding the WPAN connection, a connection is established based on, for example, the IEEE 802.15 standard, and regarding the WLAN connection, a connection is established based on, for example, the IEEE 802.11 standard. For instance, the connection device 130 may be a device supporting Bluetooth wireless communication technology for WPAN and may also be a device supporting wireless fidelity (Wi-Fi) communication technology for WLAN, which is not limited by the disclosure.

The processor 140 is coupled to the screen 110, the storage device 120, and the connection device 130 and is configured to control movements among devices of the electronic apparatus 10. The processor 140 may be, for example, a central processing unit (CPU) or a programmable microprocessor for general or special use, a digital signal processor (DSP), a programmable controller, an application specific integrated circuit (ASIC), a programmable logic device (PLD), a graphics processing unit (GPU), or any other similar devices or a combination of the foregoing devices. The processor 140 may execute program codes, software modules, commands, etc. stored in the storage device 120 to perform a data transmission method provided by the disclosure.

Nevertheless, in addition to the screen 110, the storage device 120, the connection device 130, and the processor 140, the electronic apparatus 10 may further include other devices that are not shown in FIG. 1, such as a touch pad, a mouse, a speaker, a microphone, a camera, a keyboard, etc., which is not limited by the disclosure.

Figure 2A:
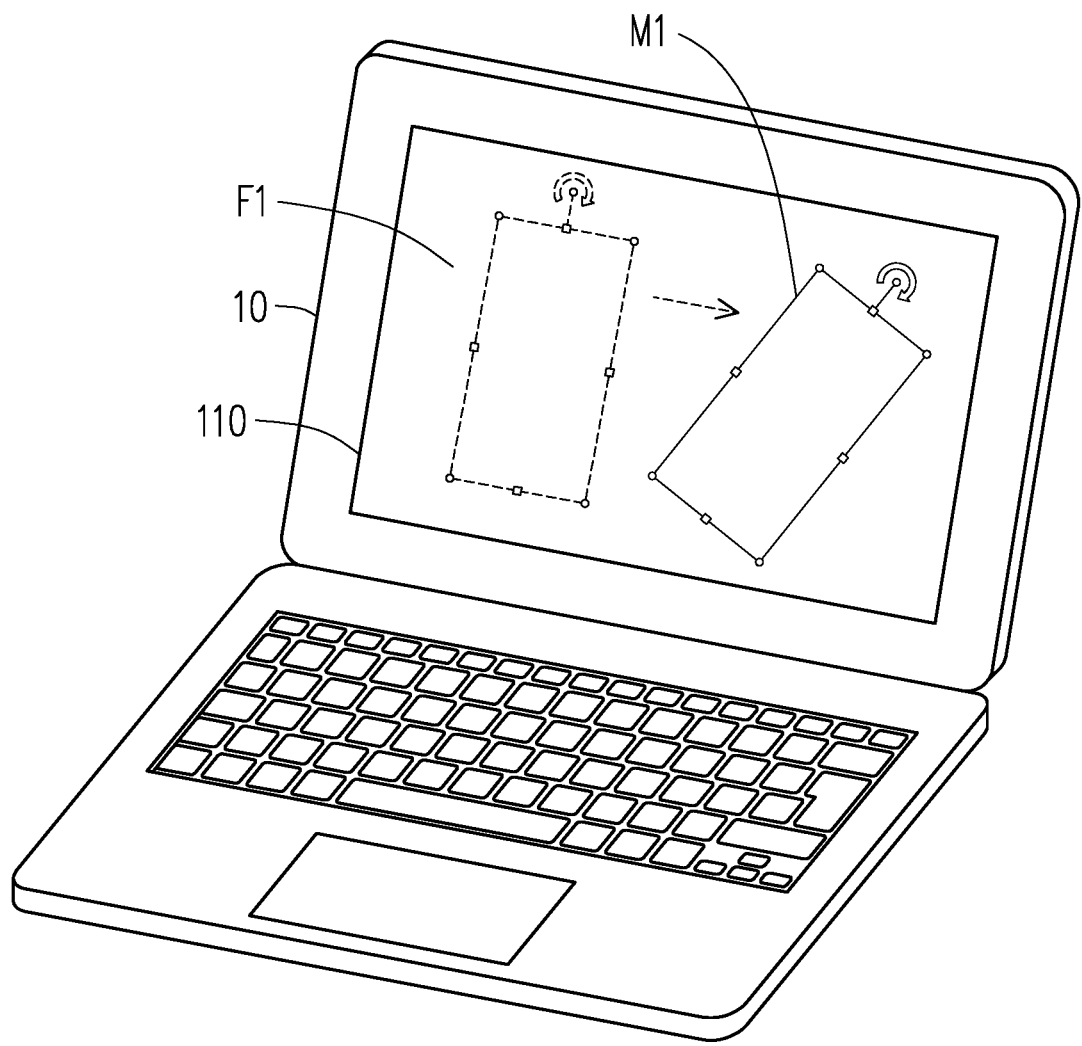
FIG. 2A and FIG. 2B are schematic views of a data transmission scenario between two electronic apparatuses according to an embodiment of the disclosure.
Figure 2B:
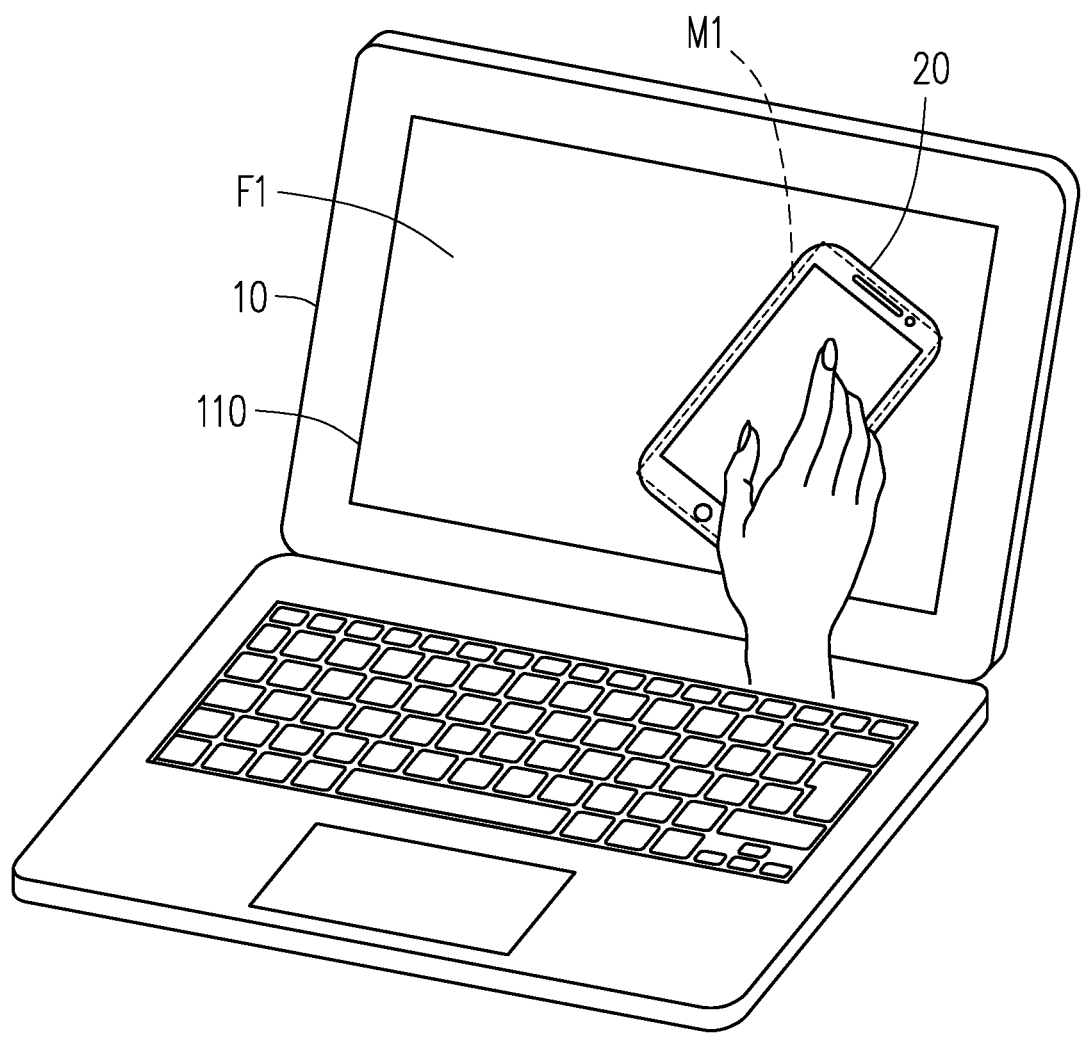

FIG. 2A and FIG. 2B are schematic views of a data transmission scenario between two electronic apparatuses according to an embodiment of the disclosure. With reference to FIG. 2A and FIG. 2B, in an embodiment, the electronic apparatus 10 acting as a data sending end is, for example, a notebook computer having the screen 110, and an electronic apparatus 20 acting as a data receiving end is, for example, a mobile phone. As shown in FIG. 2A, the screen 110 may display an image frame F1, and the image frame F1 may present a plurality of file icons, file names, or web addresses. Moreover, the screen 110 may display a selection marquee M1 on the image frame F1, and the selection marquee M1 may be moved or rotated in response to an operation performed by a user. In an embodiment, the user may drag or rotate the selection marquee M1 to select a file icon, a file name, or a partial character string and the like of data to be transmitted presented in the image frame F1.

Next, as shown in FIG. 2B, when the user intends to send the data to be transmitted in the electronic apparatus 10 to the electronic apparatus 20, the user may place the electronic apparatus 20 close to the screen 110 according to a prompt location prompted by the selection marquee M1. In this way, an image capturing device (e.g., a front lens or a rear lens) of the electronic apparatus 20 may capture display content in the selection marquee M1. In an embodiment, the electronic apparatus 10 may determine a size of the selection marquee M1 according to apparatus information of the electronic apparatus 20. That is, the size and a shape of the selection marquee M1 may be determined according to an outer contour of the electronic apparatus 20. Accordingly, an edge of a housing of the electronic apparatus 20 may be attached to the selection marquee M1, so that the user may intuitively place the electronic apparatus 20 on the selection marquee M1 displayed on the screen 110. In an embodiment, the electronic apparatus 20 may actually be in contact with the screen 110 or may be sufficiently close to the screen 110 (suspended on the screen 110). Accordingly, the image capturing device of the electronic apparatus 20 may capture the display content in the selection marquee M1. In an embodiment, the electronic apparatus 10 may display connection information on a display region in the selection marquee M1 through the screen 110, and the electronic apparatus 20 may obtain the connection information according to a captured image and automatically establishes a connection with the electronic apparatus 10 accordingly.

On the other hand, according to a range selected by the selection marquee M1, the electronic apparatus 10 may capture a partial image frame from the image frame F1 and recognize feature information of the data to be transmitted selected by the user from the partial image frame, such as a file name or a web address and the like. In this way, after the user places the electronic apparatus 20 on the screen 110, the electronic apparatus 10 automatically establishes a connection with the electronic apparatus 20 and sends the data to be transmitted selected by the user to the electronic apparatus 20.

Figure 3:
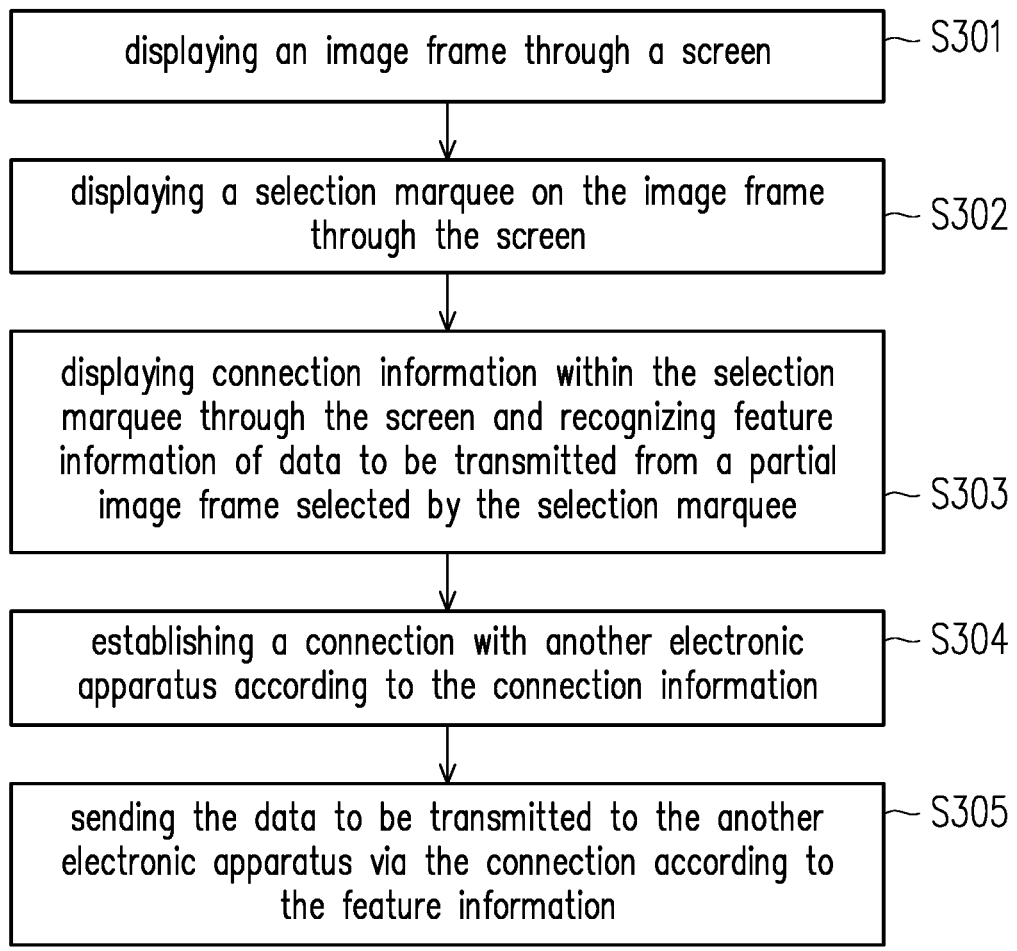
FIG. 3 is a flow chart of a data transmission method according to an embodiment of the disclosure.

In order to further describe a data transmission method of the electronic apparatus in detail, another embodiment is illustrated as follows to describe the disclosure. FIG. 3 is a flow chart of a data transmission method according to an embodiment of the disclosure. With reference to FIG. 1 and FIG. 3 together, the method of this embodiment is adapted to the electronic apparatus 10 in FIG. 1. The flow of the method of this embodiment is explained in detail below together with the devices in the electronic apparatus 10.

In step S1301, the processor 140 displays an image frame through the screen 110. The image frame includes a desktop, an application window, or a combination thereof. In an embodiment, the image frame may present file icons and file names of a plurality of files, or alternatively, the image frame may present complete or fragmented web address content. The image frame presented by the screen 110 may be generated through superimposing of at least one original image layer (i.e., a first display image layer).

In step S302, the processor 140 displays a selection marquee on the image frame through the screen 110. The selection marquee is configured for selecting a partial image frame from the image frame. Specifically, in an embodiment, the processor 140 may generate a specific image layer including the selection marquee and displays the selection marquee on the image frame through displaying the specific image layer and the at least one original image layer in an overlapping manner.

In an embodiment, in response to a dragging operation applied to the selection marquee, the processor 140 may move the selection marquee on the image frame from a first location to a second location. In response to a rotating operation applied to the selection marquee, the processor 140 may rotate the selection marquee on the image frame. For instance, the user may use an input device (e.g., a mouse) to drag the selection marquee on the image frame to change a display location of the selection marquee. Alternatively, the user may use an input device (e.g., a mouse) to control the selection marquee on the image frame to rotate by any angle based on a reference point (e.g., a central point of the selection marquee) acting as a rotation center.

In step S303, the processor 140 displays the connection information within the selection marquee through the screen 110 and recognizes feature information of the data to be transmitted from the partial image frame selected by the selection marquee. Specifically, the processor 140 may capture the partial image frame from a current image frame according to region selected by the selection marquee. For instance, the processor 140 may utilize the screenshot function to capture the partial image frame from the image frame according to the four corner-point coordinates of the selection marquee. Next, the processor 140 recognizes the feature information of the data to be transmitted from the partial image frame. For instance, the processor 140 may perform character recognition or image recognition on the partial image frame selected by the selection marquee, so as to obtain the feature information of the data to be transmitted. The feature information of the data to be transmitted is, for example, a file name, web address content, a photo thumbnail, etc. It thus can be known that when the user intends to send a file or a web address in the current image frame displayed by the screen 110 to another electronic apparatus, the user may control the selection marquee to select the feature information related to the data to be transmitted.

In addition, the processor 140 may control the screen 110 to display the connection information on the display region in the selection marquee. Correspondingly, the image capturing device of another electronic apparatus which is placed close to the selection marquee may capture the display content of the selection marquee, so as to further analyze the connection information according to the captured image. The connection information is, for example, the IP address, MAC address, port number, or Bluetooth pairing information and so on of the electronic apparatus 10. In an embodiment, the processor 140 may utilize color coding to encode the connection information of the electronic apparatus 10 into a combination of multiple colors and continuously displays these colors on the display region in the selection marquee through the screen 110. In this way, the another electronic apparatus may correspondingly decode the connection information of the electronic apparatus 10 according to the colors in the captured image. Alternatively, the processor 140 may generate a two-dimensional barcode, a three-dimensional barcode, or other totems according to the connection information of the electronic apparatus 10, so that the another electronic apparatus may correspondingly analyze the connection information of the electronic apparatus 10 according to the captured image.

Note that in an embodiment, when the connection information is not yet displayed, the processor 140 may superimpose at least one first display image layer and the specific image layer including the selection marquee to generate a display image frame for the screen 110. Image frame content of the partial image frame comes from the at least one first display image layer. On the other hand, when the connection information is displayed, the processor 140 generates a second display image layer including the connection information and superimposes the at the at least one first display image layer and the second display image layer to generate the display image frame for the screen 110. That is, the connection information is presented in the second display image layer.

In step S304, the processor 140 establishes a connection with another electronic apparatus according to the connection information. In an embodiment, after the another electronic apparatus obtains the connection information displayed within the selection marquee through the image capturing device, the processor 140 may establish a connection in response to a connection request from the another electronic apparatus. In detail, the another electronic apparatus may analyze the connection information according to an image captured by the image capturing device and accordingly establishes a connection with the electronic apparatus 10 in which the hotspot function or the Bluetooth function is turned on through the WI-FI communication technology or the Bluetooth communication technology.

In step S305, the processor 140 sends the data to be transmitted to the another electronic apparatus via the connection according to the feature information. Specifically, after obtaining the feature information of the data to be transmitted, the processor 140 may know the data to be transmitted selected by the user and sends the data to be transmitted to the another electronic apparatus through a wireless communication connection with the another electronic apparatus. For instance, the processor 140 may use the socket connection regulated in the Transmission Control Protocol session (TCP session) to send the data to be transmitted to the another electronic apparatus through the connection device 130.

Figure 4:
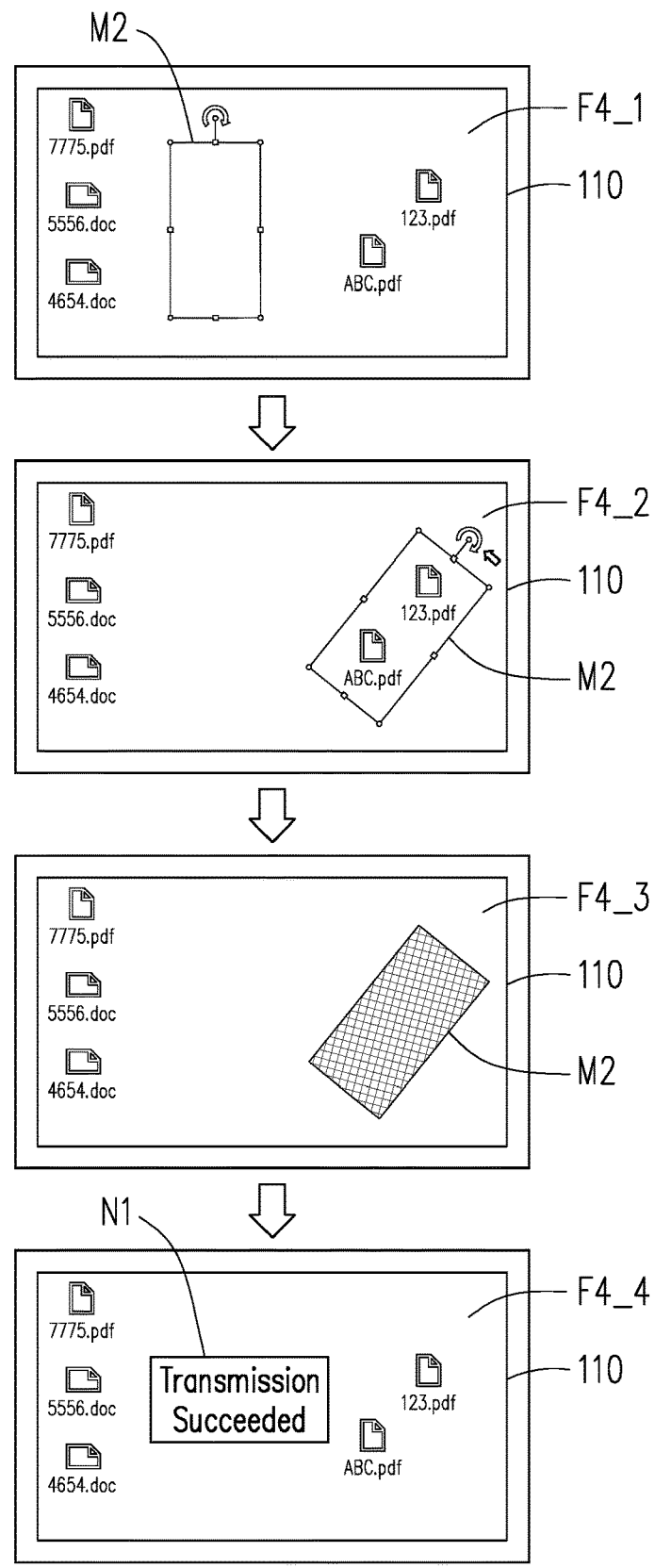
FIG. 4 is a schematic view of an example of a display image frame including connection information and a selection marquee according to an embodiment of the disclosure.

FIG. 4 is a schematic view of an example of a display image frame including connection information and a selection marquee according to an embodiment of the disclosure. With reference to FIG. 4, the screen 110 displays an image frame F4_1 and a selection marquee M2, and the image frame F4_1 is a desktop presenting a plurality of file icons. After the user drags the selection marquee M2 to the right and rotates the selection marquee M2 through a mouse, the screen 110 displays an image frame F4_2. After determining a location of the selection marquee M2, the user may place another electronic apparatus above the selection marquee M2. Next, the screen 110 displays an image frame F4_3. In the image frame F4_3, the screen 110 displays connection information within the selection marquee M2. Accordingly, when the another electronic apparatus covers the selection marquee M2, the image capturing device of the another electronic apparatus may capture the display content related to the connection information within the selection marquee M2, but the user may not notice a change in the display content of the screen 110. Therefore, the user may not observe any interference on the image frame when the screen is required to display the connection information, and a favorable viewing experience is thus provided. Finally, after the connection is automatically established and transmission of the data to be transmitted is completed, the screen 110 displays an image frame F4_4. In the screen F4_4, the screen 110 displays a notification message N1 to inform the user that data transmission is completed. In another embodiment, the notification message N1 may also be displayed on the screen of the another electronic apparatus acting as the data receiving end.

Figure 5:
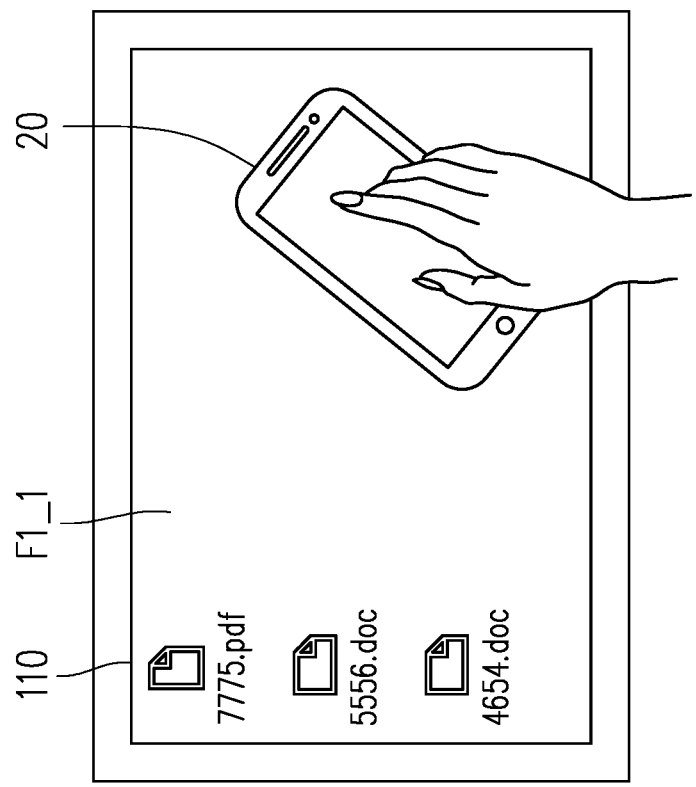
FIG. 5 is a schematic view of an application scenario of a data transmission method according to an embodiment of the disclosure.
Figure 5:
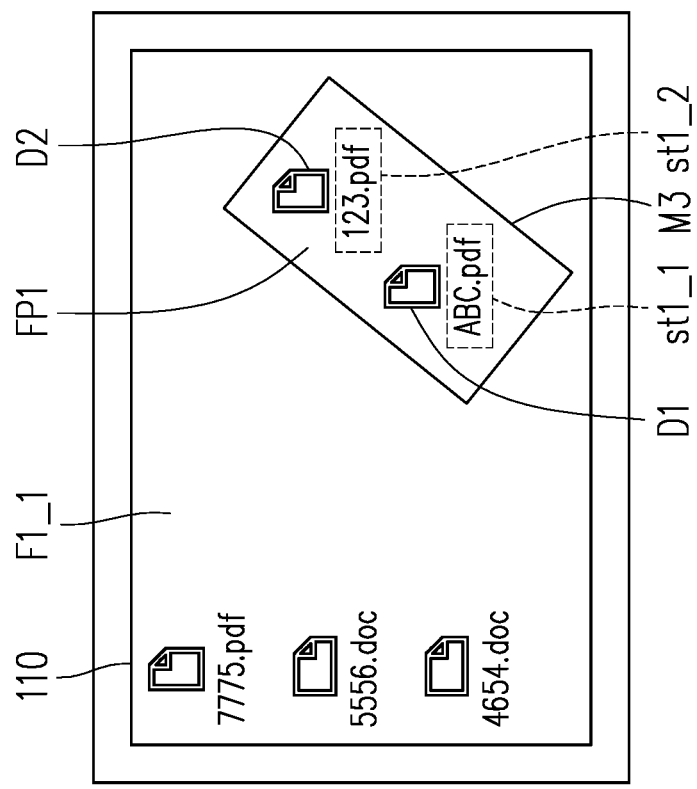

FIG. 5 is a schematic view of an application scenario of a data transmission method according to an embodiment of the disclosure. In the example shown in FIG. 5, the data to be transmitted may be a file and may be a file of any type, which is not limited by the disclosure. For instance, the data to be transmitted may be a document file, an image file, a music file, a video file, a program file, and so on. With reference to FIG. 5, the screen 110 displays a desktop image frame F1_1, and the desktop image frame F1_1 displays file icons and file names of a plurality of files. In this example, the user controls a selection marquee M3 to select file icons and file names of files D1 and D2 of interest. Accordingly, the electronic apparatus 10 may capture a partial image frame FP1 from the desktop image frame F1_1 according to location information (e.g., 4 coordinate locations) of the selection marquee M3. Herein, the partial image frame FP1 includes the file icons and file names of the two files D1 and D2. Therefore, through performing character recognition on the partial image frame FP1, the electronic apparatus 10 may obtain two character strings st1_1 and st1_2 having a file name "ABC.pdf" and a file name "123.pdf" respectively. The electronic apparatus 10 may obtain file path locations of the files D1 and D2 according to the file names "ABC.pdf" and "123.pdf" through an application program interface (API) of an operating system and sends both the files D1 and D2 or one of the files D1 and D2 to the electronic apparatus 20. In an embodiment, when file icons and file names of a plurality of files are included in the partial image frame, a user selection interface may be displayed through the electronic apparatus 10 or the electronic apparatus 20 to allow the user to select one of the files D1 and D2.

Figure 6:
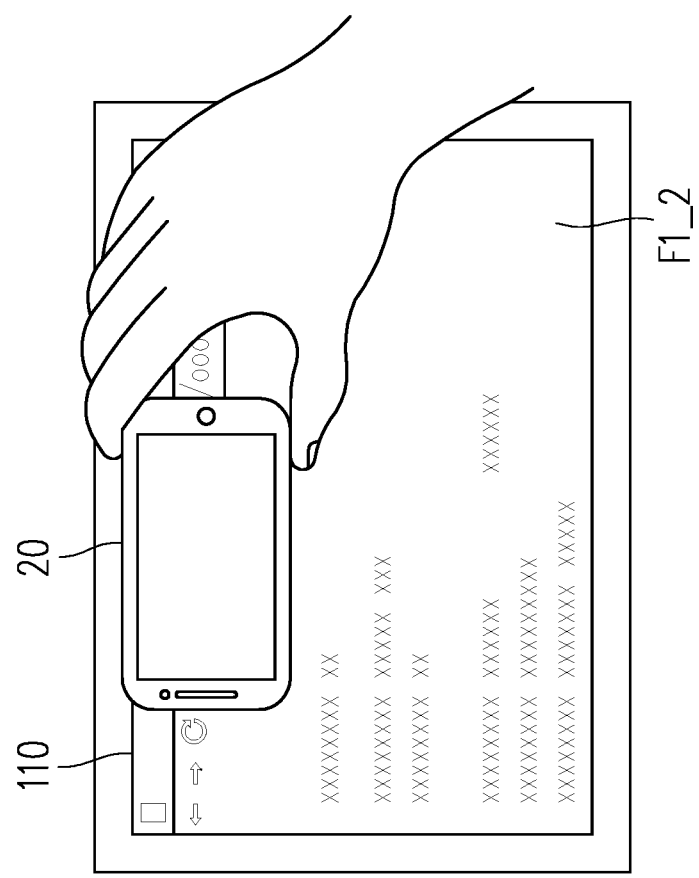
FIG. 6 is a schematic view of an application scenario of a data transmission method according to an embodiment of the disclosure.
Figure 6:
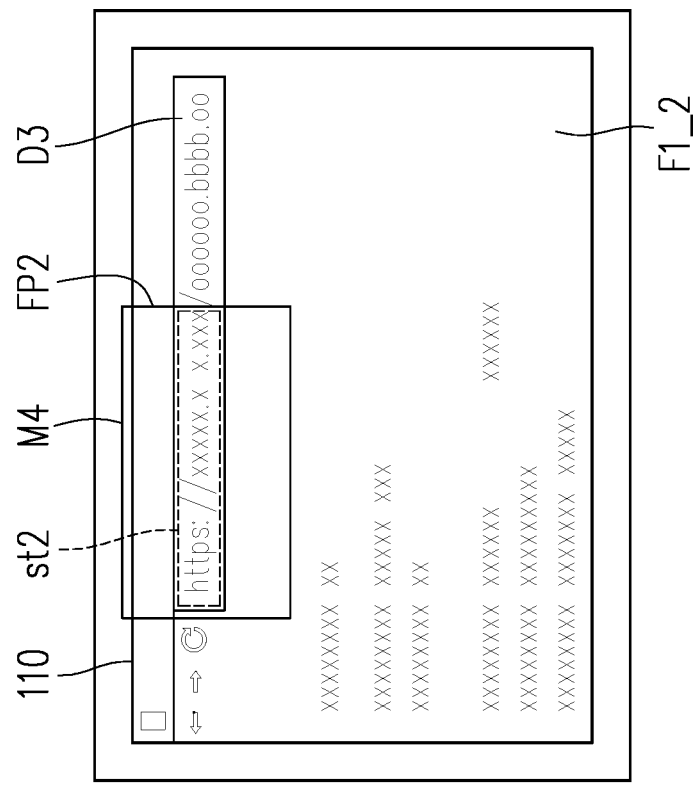

FIG. 6 is a schematic view of an application scenario of a data transmission method according to an embodiment of the disclosure. In the example shown in FIG. 6, the data to be transmitted may be a web address. With reference to FIG. 6, the screen 110 displays an application image frame F1_2, and the application image frame F1_2 is a browser image frame and has a web address input field. In this example, the user controls a selection marquee M4 to select a partial web address. Accordingly, the electronic apparatus 10 may capture a partial image frame FP2 from the application image frame F1_2 according to location information of the selection marquee M4. Herein, the partial image frame FP2 includes partial web address content of a web address D3. Therefore, through performing character recognition and keyword recognition on the partial image frame FP2, the electronic apparatus 10 may obtain a character string st2 including a keyword "https", and the character string st2 may include a partial or a complete web address. In this example, the character string st2 is the partial web address content "http://xxxxx.xx.xxx". Therefore, the electronic apparatus 10 searches the complete web address D3 from a webpage source code according to the partial web address content "http://xxxxx.xx.xxx" and sends the complete web address D3 to the electronic apparatus 20.

It should be noted that the embodiments of the disclosure are not limited to the foregoing descriptions. The above embodiments may be varied/modified according to the actual needs. For instance, for the sake of data security, the electronic apparatus 10 may perform user authentication on the electronic apparatus 20 or may determine whether to transmit data according to confidentiality of the data. An embodiment of the disclosure is provided as follows to specifically describe steps of data transmission between electronic apparatuses.

Figure 7:
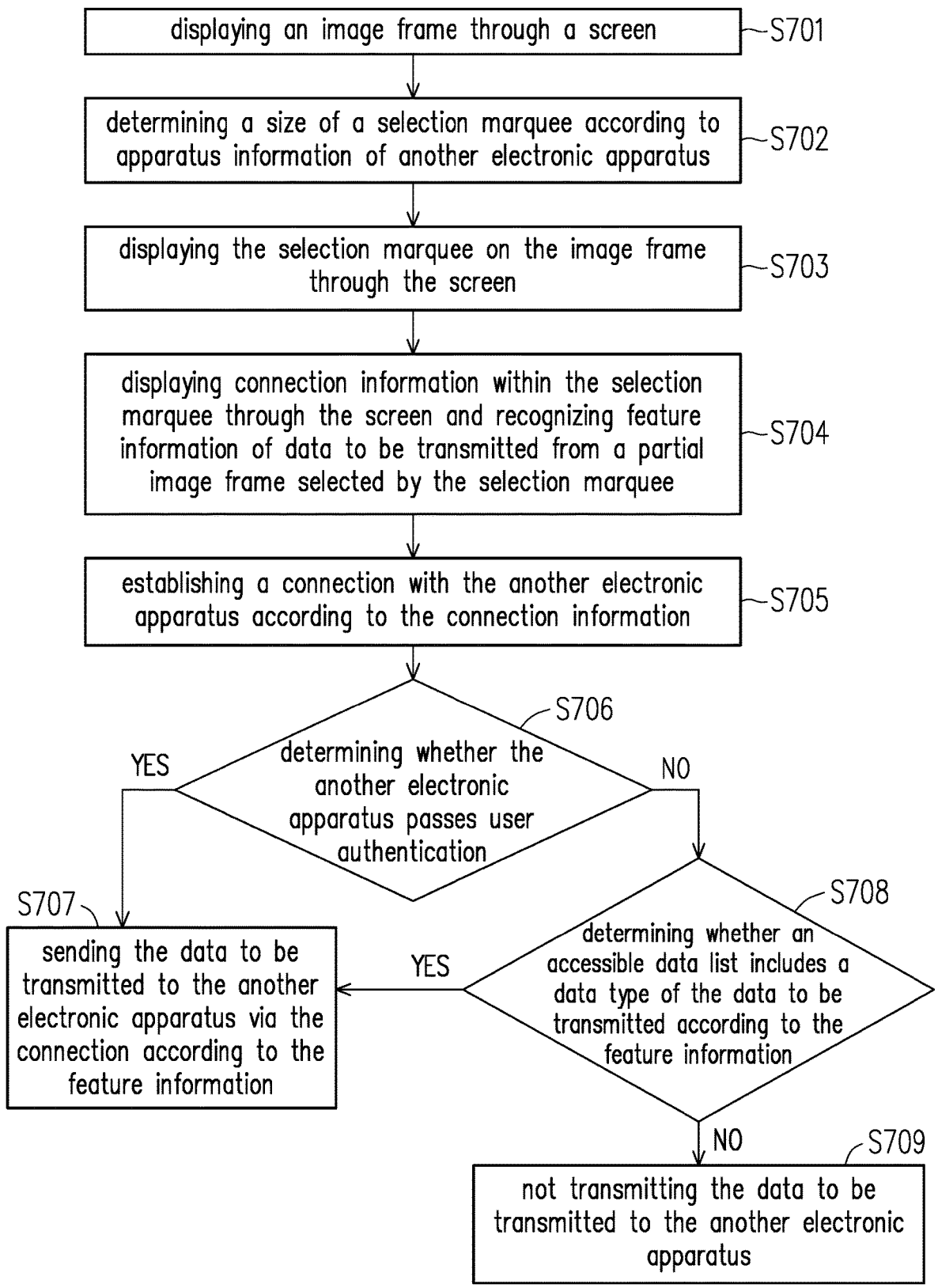
FIG. 7 is a flow chart of a data transmission method according to an embodiment of the disclosure.

FIG. 7 is a flow chart of a data transmission method according to an embodiment of the disclosure. With reference to FIG. 1 and FIG. 7 together, the method of this embodiment is adapted to the electronic apparatus 10 in FIG. 1. The flow of the method of this embodiment is explained in detail below together with the devices in the electronic apparatus 10.

In step S701, the processor 140 displays an image frame through the screen 110. In step S702, the processor 140 determines a size of a selection marquee according to apparatus information of another electronic apparatus. The apparatus information is, for example, an apparatus model number, an apparatus size, an apparatus type, and so on. In an embodiment, the processor 140 may control the screen 110 to provide an input interface configured for setting the apparatus information of the another apparatus, so that the user may make selection from a selection list or input the apparatus information by his/herself. For instance, the user may select the apparatus model number of the another electronic apparatus from a mobile phone model number list. Next, the processor 140 may determine the size of the selection marquee according to a mobile phone model number inputted by the user. When the another electronic apparatus belongs to a first apparatus model number, the processor 140 may set the selection marquee to be a rectangle of a first size. When the another electronic apparatus belongs to a second apparatus model number, the processor 140 may set the selection marquee to be a rectangle of a second size. The first size is different from the second size.

Next, in step S702, the processor 140 displays the selection marquee on an image frame through the screen 110. In step S704, the processor 140 displays connection information within the selection marquee through the screen 110 and recognizes feature information of data to be transmitted from a partial image frame selected by the selection marquee. In step S705, the processor 140 establishes a connection with the another electronic apparatus according to the connection information.

In step S706, the processor 140 determines whether the another electronic apparatus passes user authentication. In other words, the processor 140 may determine whether the another electronic apparatus is held by a specific authenticated user according to authentication information (e.g., the MAC address or other unique identification codes, etc.) of the another electronic apparatus, and the authentication information may be provided to the processor 140 at the connection establishment stage. In an embodiment, the processor 140 determines whether the authentication information provided by the another electronic apparatus matches qualification authentication information recorded by the storage device 120, so as to further determine whether the another electronic apparatus passes the user authentication.

In the case that the another electronic apparatus passes the user authentication, in step S707, the processor 140 sends the data to be transmitted to the another electronic apparatus via the connection according to the feature information. In the case that the another electronic apparatus does not pass the user authentication, in step S708, the processor 140 determines whether an accessible data list includes a data type of the data to be transmitted according to the feature information. Table 1 is an example of the accessible data list, but the example is not intended to limit the disclosure.

TABLE 1

| | Accessible Data Type |
|---|---|
| 1 | compressed file |
| 2 | PDF file |
| 3 | picture file |
| 4 | web address |

Based on the example provided by Table 1, the processor 140 determines whether the data type of the data to be transmitted is a compressed file, a PDF file, a picture file, or a web address, so as to determine whether to transmit the data to be transmitted to the another electronic apparatus. That is, in the case that the accessible data list includes the data type of the data to be transmitted, with reference to step S707 again, the processor 140 sends the data to be transmitted to the another electronic apparatus via the connection according to the feature information. In contrast, in the case that the accessible data list does not include the data type of the data to be transmitted, in step S709, the processor 140 does not transmit the data to be transmitted to the another electronic apparatus. Note that the accessible data list and the qualification authentication information which may pass the user authentication may be established in the storage device 120 through initialization configuration.

In view of the foregoing, in the embodiments of the disclosure, the screen of the electronic apparatus may display a selection marquee on the image frame. The selection marquee may be moved or rotated above the image frame in response to an operation performed by the user. The electronic apparatus displays the connection information within the selection marquee through the screen and recognizes the feature information of the data to be transmitted from the partial image frame selected by the selection marquee. Therefore, the electronic apparatus may establish a connection with another electronic apparatus in response to the connection information displayed in the selection marquee and sends the data to be transmitted to the another electronic apparatus according to the feature information presented in the partial image frame. Accordingly, the selection marquee may be configured to determine displaying the display location of the connection information and marking the data to be transmitted at the same time, so that operational steps of data transmission between apparatuses are significantly simplified, and convenience of using the electronic apparatuses is improved. In addition, data transmission security is enhanced through deployment of the accessible data list and the user authentication.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data transmission method, adapted to an electronic apparatus comprising a screen, the data transmission method comprising:
    displaying an image frame through the screen;
    determining a size of a selection marquee according to apparatus information of another electronic apparatus and displaying the selection marquee on the image frame through the screen, wherein the selection marquee is configured for selecting a partial image frame from the image frame;
    displaying connection information comprising a connection address or pairing information within the selection marquee through the screen in response to the another electronic apparatus covers the selection marquee on the screen according to a prompt location prompted by the selection marquee;
    recognizing feature information of data to be transmitted from the partial image frame selected by the selection marquee;
    establishing a connection with the another electronic apparatus in response to a connection request from the another electronic apparatus covering on the selection marquee after the another electronic apparatus obtains the connection information displayed within the selection marquee by capturing an image through an image capturing device; and
    sending the data to be transmitted to the another electronic apparatus via the connection according to the feature information.

2. The data transmission method according to claim 1, further comprising:
    moving the selection marquee on the image frame from a first location to a second location in response to a dragging operation applied to the selection marquee.

3. The data transmission method according to claim 1, further comprising:
    rotating the selection marquee on the image frame in response to a rotating operation applied to the selection marquee.

4. The data transmission method according to claim 1, wherein the image frame comprises a desktop, an application window, or a combination thereof.

5. The data transmission method according to claim 1, wherein the data to be transmitted comprises a web address, and the step of recognizing the feature information of the data to be transmitted from the partial image frame selected by the selection marquee comprises:
    performing character recognition on the partial age frame to obtain at least one character string, wherein the at least one character string comprises a partial portion or a complete portion of the web address.

6. The data transmission method according to claim 1, wherein the data to be transmitted comprises a file, and the step of recognizing the feature information of the data to be transmitted from the partial image frame selected by the selection marquee comprises:

performing character recognition on the partial image frame to obtain at least one character string, wherein the at least one character string comprises a file name of the file.

7. An electronic apparatus, comprising:
a screen, displaying an image frame;
a connection device;
a storage device, storing a plurality of modules; and
a processor, coupled to the screen, the connection device, and the storage device, configured for:
determining a size of a selection marquee according to apparatus information of the another electronic apparatus before displaying the selection marquee on the image frame and displaying the selection marquee on the image frame through the screen, wherein the selection marquee is configured for selecting a partial image frame from the image frame;
displaying connection information comprising a connection address or pairing information within the selection marquee through the screen in response to the another electronic apparatus covers the selection marquee on the screen according to a prompt location prompted by the selection marquee;
recognizing feature information of data to be transmitted from the partial image frame selected by the selection marquee;
establishing a connection with the another electronic apparatus in response to a connection request from the another electronic apparatus covering the selection marquee after the another electronic apparatus obtains the connection information displayed within the selection marquee by capturing an image through an image capturing device; and
sending the data to be transmitted to the another electronic apparatus via the connection according to the feature information.

8. The electronic apparatus according to claim 7, wherein the processor is further configured for:
moving the selection marquee on the image frame from a first location to a second location in response to a dragging operation applied to the selection marquee.

9. The electronic apparatus according to claim 7, wherein the processor is further configured for:
rotating the selection marquee on the image frame in response to a rotating operation applied to the selection marquee.

10. The electronic apparatus according to claim 7, wherein the image frame comprises a desktop, an application window, or a combination thereof.

11. The electronic apparatus according to claim 7, wherein the data to be transmitted comprises a web address, and the processor is further configured for:
performing character recognition on the partial image frame to obtain at least one character string, wherein the at least one character string comprises a partial portion or a complete portion of the web address.

12. The electronic apparatus according to claim 7, wherein the data to be transmitted comprises a file, and the processor is further configured for:
performing character recognition on the partial image frame to obtain at least one character string, wherein the at least one character string comprises a file name of the file.

* * * * *